United States Patent
Maruyama et al.

(10) Patent No.: US 9,748,051 B2
(45) Date of Patent: Aug. 29, 2017

(54) OPERATING MECHANISM INCLUDING A MOVABLE ELEMENT SUPPORTED BY ELECTROMAGNETIC FORCE

(71) Applicant: Kabushiki Kaisha Toshiba, Minato-ku (JP)

(72) Inventors: Yutaka Maruyama, Tokorozawa (JP); Katsumi Suzuki, Yokohama (JP); Yoshiaki Ohda, Yokohama (JP); Satoshi Marushima, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 6 days.

(21) Appl. No.: 14/693,097

(22) Filed: Apr. 22, 2015

(65) Prior Publication Data

US 2015/0228417 A1 Aug. 13, 2015

Related U.S. Application Data

(63) Continuation of application No. PCT/JP2013/006174, filed on Oct. 17, 2013.

(30) Foreign Application Priority Data

Oct. 22, 2012 (JP) ................. 2012-232675

(51) Int. Cl.
*H01H 3/26* (2006.01)
*H01H 33/38* (2006.01)
(Continued)

(52) U.S. Cl.
CPC .............. *H01H 3/26* (2013.01); *H01H 33/38* (2013.01); *H02K 41/031* (2013.01); *H01F 7/066* (2013.01);
(Continued)

(58) Field of Classification Search
CPC .......... H01H 33/38; H01H 3/26; H01H 33/42; H01H 2003/268
See application file for complete search history.

(56) References Cited

U.S. PATENT DOCUMENTS 3,942,145 A * 3/1976 Sobczak .................. H01H 5/02
  200/288
8,397,369 B2 * 3/2013 Smith .................. H02K 1/2766
  29/596

(Continued)

FOREIGN PATENT DOCUMENTS

CN 100543899 C 9/2009
EP 2 372 886 A1 10/2011
(Continued)

OTHER PUBLICATIONS

Extended European Search Report issued Jun. 21, 2016 in Patent Application No. 13848618.8.

*Primary Examiner* — Bernard Rojas
(74) *Attorney, Agent, or Firm* — Oblon, McClelland, Maier & Neustadt, L.L.P.

(57) ABSTRACT

There are provided a row of external permanent magnets and a row of internal permanent magnets; a floating output ring is provided on which is wound a 3-phase coil, between these rows. The floating output ring has no mechanical restraining relationship with any other member in the linear motor). Instead, a controller that controls a PWM inverter that injects AC exciting current into the 3-phase coil brings the central axes of the double cylinder and the floating output ring into coincidence by generating supporting force with respect to the floating output ring by magnetism, by controlling the d axis current component of the exciting current.

7 Claims, 8 Drawing Sheets

(51) Int. Cl.
*H02K 41/03* (2006.01)
*H01H 33/42* (2006.01)
*H01F 7/06* (2006.01)
*H02P 25/06* (2016.01)

(52) U.S. Cl.
CPC ....... *H01H 33/42* (2013.01); *H01H 2003/268* (2013.01); *H02P 25/06* (2013.01)

(56) References Cited

U.S. PATENT DOCUMENTS

| | | | |
|---|---|---|---|
| 2007/0273461 A1* | 11/2007 | Kang | H01F 7/066 335/6 |
| 2012/0068796 A1* | 3/2012 | Santichen | F02N 11/087 335/256 |
| 2015/0042424 A1 | 2/2015 | Maruyama et al. | |

FOREIGN PATENT DOCUMENTS

| | | |
|---|---|---|
| JP | 58-140928 | 8/1983 |
| JP | 58-140928 A | 8/1983 |
| JP | 5-89755 | 4/1993 |
| JP | 5-89755 A | 4/1993 |
| JP | 10-40782 | 2/1998 |
| JP | 11-25817 | 1/1999 |
| JP | 2002-124158 | 4/2002 |
| JP | 2003-16888 | 1/2003 |
| JP | 2007-82352 A | 3/2007 |
| JP | 2008-21599 | 1/2008 |
| JP | 2009-212372 | 9/2009 |
| JP | 2007-523475 | 7/2010 |
| JP | 2010-154588 | 7/2010 |
| JP | 4625032 B2 | 2/2011 |
| JP | 4629271 B2 | 2/2011 |
| JP | 5404029 B2 | 1/2014 |
| WO | WO 98/37615 A1 | 8/1998 |

* cited by examiner

A-A' CROSS-SECTION

B-B' CROSS-SECTION

OPERATING MECHANISM INCLUDING A MOVABLE ELEMENT SUPPORTED BY ELECTROMAGNETIC FORCE

CROSS-REFERENCE TO RELATED APPLICATION

This is a Continuation of PCT Application No. PCT/JP2013/006174, filed on Oct. 17, 2013, which is based upon and claims the benefit of priority from the prior Japanese Patent Application No. 2012-232675, filed on Oct. 22, 2012, the entire contents of which are incorporated herein by reference.

FIELD

An embodiment of the present invention relates to an operating mechanism of an electromagnetic drive system that operates a movable contact, and to a power switching device provided with such an operating mechanism.

BACKGROUND

A power switching device is a device comprising a pair of contacts that opens and closes an electrical circuit by opening or closing these contacts. When a fault current is detected, an interruption signal is input to the power switching device and in response to this interruption signal the power switching device separates the contacts so as to interrupt the current.

In addition, such a power switching device is typically provided with a pair of arc contacts and a buffer chamber or pressurizing chamber. These arc contacts accept the arc discharge (or electric arc) that is generated by separation of the contacts. The puffer chamber and/or pressurizing chamber comprise a piston and cylinder, and compress the gas present in the chamber by relative movement of the cylinder and piston, so that high-pressure gas from within the chamber can be directed between the arc contacts. The arc discharge is extinguished by this high-pressure gas blast, thereby completing current interruption.

The operating mechanism is provided in order to effect relative movement of the movable contact for such circuit switching, the arc movable contact, and the piston or cylinder. This operating mechanism is therefore required to be capable of being driven when desired, capable of high-speed movement of the movable element, and to provide excellent response of the movable element.

The reason why the operating mechanism is required to be capable of being driven when desired is that it is desirable to perform the interruption action with an appropriate timing, at which interruption can easily be effected, with reference to the variations in the conditions relating to extinction after generation of the fault current, because of the periodic fluctuation of the voltage, when the fault current is AC, or random fluctuations of phase when the fault current is generated. The reason why the movable element is required to be capable of high-speed movement and excellent response is that the interruption action must be completed in the short time of a few tens of msec from initiation of the interruption instruction.

Furthermore, in addition to such drive performance aspects, in view of progress with underground deployment of power equipment and drive mechanisms, restrictions are being demanded regarding the size of the operating mechanism and demands are being made in regard to maintainability.

Operating mechanisms that have currently been proposed include a pneumatic-type operating mechanism, a hydraulic-type mechanism, a spring type mechanism or an electromagnetic drive type mechanism. A hydraulic type mechanism is a type in which the movable section is driven using a hydraulic actuator. The spring system is a system in which the movable section is driven using energy obtained when a compressed spring is released, and is the system that is currently chiefly used. The electromagnetic drive system is a system in which the movable section is driven by an electromagnetic actuator.

The hydraulic system typically makes it possible to obtain large thrust and is advantageous for achieving high speed of operation. In view of the magnitude of the drive energy that can be obtained from a hydraulic mechanism, a hydraulic mechanism may be expected to be of smaller size than a spring mechanism; however, it does have the drawbacks that a hydraulic system is required including at least a hydraulic pump and accumulator and is subject to oil leakage and temperature dependence, making it unsuitable as a mechanism for use for example in cold regions.

The spring system is the system that is currently chiefly employed; this system is applicable in regions including for example cold regions since, compared with a hydraulic system, it does not suffer from oil leakage and has no temperature dependence. However, this system displays a high risk of failure when driven on multiple occasions, since it is complicated, being constructed of a large number of components and including a large number of sliding sections. This therefore involves a large amount of labor, since the maintenance frequency is high and the construction is complicated, with a large number of components. Thus the maintenance characteristics cannot be said to be advantageous, from the point of view of frequency and labor involved in maintenance. Furthermore, since spring force is utilized, the mechanism cannot be driven at will.

In contrast, the electromagnetic type is superior in terms of maintenance since its construction is straightforward, so the number of components and sliding sections is small. The speed of response to an electrical signal is also very high. Examples of the electromagnetic type of drive system include systems in which the movable contact is driven by directly converting the drive force of a rotary electrical machine, such as for example Laid-open Japanese Patent Application Tokkai 2009-212372 (hereinafter referred to as Patent Reference 1) or Laid-open Japanese Patent Application Tokkai 2008-021599 (hereinafter referred to as Patent Reference 2). In these systems, the operating mechanism can be driven at will by controlling the drive of the rotary electrical machine.

Also, as examples in which electromagnetic attractive force or electromagnetic repulsive force are directly employed as thrust, there may be mentioned systems utilizing the attractive force of an electromagnet and permanent magnet, such as for example Laid-open Japanese Patent Application Tokkai 2003-016888 (hereinafter referred to as Patent Reference 3), or systems utilizing electromagnetic attractive force or repulsive force acting on an air-core coil, for example Laid-open Japanese Patent Application Tokkai H 10-040782, Tokkai 2002-124158 (hereinafter referred to as Patent Reference 4 and Patent Reference 5), or systems utilizing induced repulsion, such as for example Laid-open Japanese Patent Application Tokkai H 11-025817 (hereinafter referred to as Patent Reference 6). When an air-core coil is employed, the characteristic advantages are obtained that the time constant of the electrical circuit is small and high response performance is obtained in initial operation.

Also, systems have been proposed in which cylindrical permanent magnets are employed that are held with a fixed mutual separation and arranged on the inside and outside: an exciting current is applied to an air-core coil that is arranged between these inside and outside cylindrical permanent magnets, thereby driving this air-core coil. Examples are Issued Japanese Patent Number 4625032 (hereinafter referred to as Patent Reference 7), or Laid-open Japanese Patent Application Number Tokkai 2010-154688 (hereinafter referred to as Patent Reference 8).

While various types of such electromagnetically driven operating mechanisms have been proposed, it has been remarked that they are inferior compared with hydraulic operating mechanisms or spring-type operating mechanisms in regard to thrust, which is actually indispensable for high-speed interruption and high-speed closure of the movable contact.

Specifically, although, in the examples using a rotary electrical machine indicated in Patent References 1 and 2, it is proposed to employ an iron core in the winding of the rotary electrical machine in order to obtain high torque, this results in large inductance and a large time constant of the electrical circuit, so there are limits to the extent to which response performance can be improved. There is therefore a trade-off between thrust and response.

Also, in the case of a system employing electromagnetic attraction or electromagnetic repulsion as in Patent References 3 to 6 as direct thrust, it is difficult to achieve drive at will in all operating regions, so it is difficult to achieve interruption action with appropriate timing such as to facilitate interruption.

In the case of a system employing an actuator in which a cylindrical permanent magnet is arranged as shown in Patent Reference 7, drive can be achieved at will, and no iron core is employed in the coil, so the inductance can be kept comparatively small.

However, in this Patent Reference 7, in order to generate more powerful magnetic flux and in order that the effects of the magnetic field should not reach the outside, a back yoke is employed, comprising cylindrical magnetic bodies outside the external cylindrical permanent magnet and inside the internal cylindrical permanent magnet: consequently, there is the problem that the inductance of at least the coil tends to be increased. Furthermore, if a powerful permanent magnet is employed in order to increase thrust, the back yoke must be made of large thickness, in order to avoid magnetic saturation of the back yoke. Consequently, even if a powerful permanent magnet was employed, it was difficult to reduce the thrust/volume ratio.

In contrast, in the case of the linear actuator of Patent Reference 8, a construction is adopted in which a back yoke is not required, by a special arrangement of permanent magnets, so that the magnetization vector varies in a periodic fashion. The actuator can therefore be said to be capable of being driven at will, having light weight and excellent response performance. By employing this actuator as the operating mechanism of a power switching device, excellent interruption performance should be obtained.

However, although the linear actuator of Patent Reference 8 has light weight and excellent response, and is capable of being driven at will, due to the actual construction of a linear actuator, it requires a linear guide to guide the movable element in the drive axis direction. Consequently although the linear actuator has excellent maintainability compared with the hydraulic type or spring type, such a linear guide tends to lower maintainability.

Also, a linear guide tends to increase bulk and raise costs. Furthermore, it tends to have an adverse effect in terms of improving operating speed, since it increases the weight of the movable section of the linear actuator.

As described above, although various electromagnetic operating mechanisms have previously been proposed for a power switching device, and these offer excellent drive performance, it cannot be said that the limit has been reached in terms of ease of maintenance of an electromagnetic system.

The present invention was made in order to solve these problems, its object being to provide an electromagnetic operating mechanism and power switching device provided therewith that does not require a mechanical guide and that has excellent maintainability.

In order to achieve the above object, the present invention is constructed as follows. Specifically, an operating mechanism for a power switching device for mutually shifting an opening/closing device between an interrupted condition and closed condition by reciprocating drive of a movable contact comprises: a first row of permanent magnets; a second row of permanent magnets; a double cylinder; a floating output ring; and exciting means.

The first row of permanent magnets is constituted by arranging annular or arcuate permanent magnets adjacently so that the magnetic poles of these permanent magnets are rotated by a maximum of 90° in each case in a cross-sectional plane including their central axes. The second row of permanent magnets is also constituted by arranging annular or arcuate permanent magnets adjacently so that the magnetic poles of these magnets are rotated by a maximum of 90° in each case in a cross-sectional plane including their central axes.

The double cylinder is fixed so that the two rows maintain a fixed distance, with said first permanent magnets and said second permanent magnets, whose magnetization vector radial components are in the same direction, facing each other. The floating output ring is arranged with a coil constituted by a conductor wound thereon, between said first row of permanent magnets and said second row of permanent magnets, and has no mechanical restraining relationship with other members, apart from being directly or indirectly linked with said movable contact.

The exciting means generates current for exciting said coil. This exciting means comprises supporting force control means and thrust control means. The supporting force control means keeps the central axes of said double cylinder and said floating output ring coincident by generating supporting force for said floating output ring by magnetism, by controlling the d axis current component of said exciting current. The thrust control means generates axial thrust between said double cylinder and said floating output ring by controlling the q axis current component of said exciting current.

Said double cylinder may comprise: a disc that links the tubes of this double cylinder at the end face thereof and that fixes the distance of these tubes; an aperture provided on said disc and through which said floating output ring passes; and a low friction resin section that offers low friction with respect to said floating output ring, and is provided at the edge of said aperture.

Also, said double cylinder may comprise: a disc that links the tubes of this double cylinder at the end face thereof and that fixes the distance of these tubes; an aperture provided on said disc and through which said floating output ring passes;

and said floating output ring may comprise a low friction resin section in the circumferential surface region through which said aperture passes.

DETAILED DESCRIPTION OF THE PREFERRED EMBODIMENTS

First Embodiment (1. Construction)
(1-1. Overall Layout)

Figure 1:
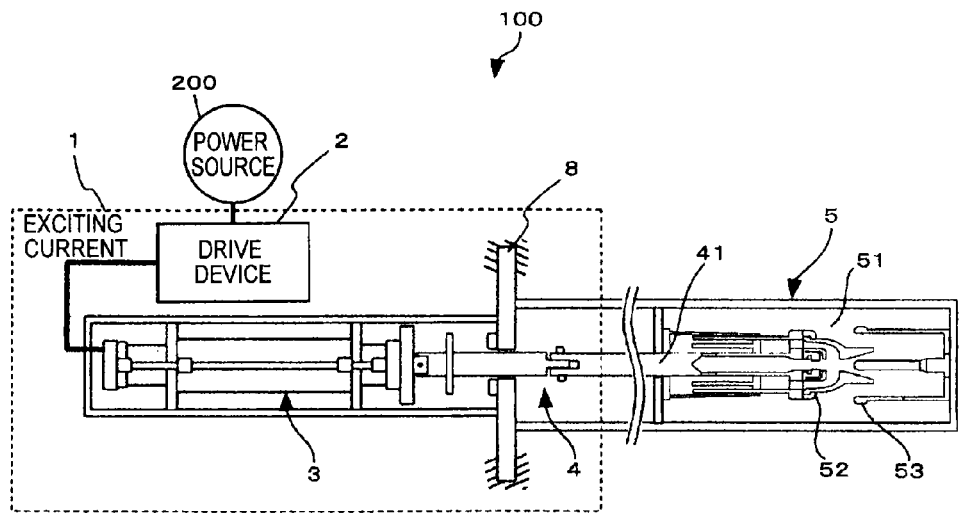
FIG. 1 is an internal layout diagram showing a power switching device according to a first embodiment.

FIG. 1 is an internal layout diagram showing a power switching device according to a first embodiment. The power switching device 100 is a device for opening and closing a circuit such as a load switch, disconnecting switch, or circuit breaker, and comprises a switching mechanism 5 and operating mechanism 1 having a drive device 2, linear motor 3 and transmission mechanism 4.

The drive device 2 drives the linear motor 3 by supplying power delivered from the power source 200 as exciting current to the linear motor 3. The linear motor 3 receives exciting current from the drive device 2 and generates thrust in the linear direction by interaction of magnetic force and by interaction of the magnetic fields and current. The transmission mechanism 4 is provided with an operating rod 41 that is capable of being extended/retracted in the axial direction, and transmits the thrust generated by the linear motor 3 to the switching mechanism 5 by pushing/pulling this operating rod 41.

In the switching mechanism 5, a movable contact 52 and fixed contact 53 are arranged in a sealed space 51 that is filled with extinguishing gas; also, the movable contact 52 is fixed to the operating rod 41 and the movable contact 52 is thus separated from or brought into contact with the fixed contact 53 in response to pushing/pulling of the operating rod 41: the switching mechanism 5 can thereby open/close the circuit.

(1-2. Linear Motor)

Figure 2:
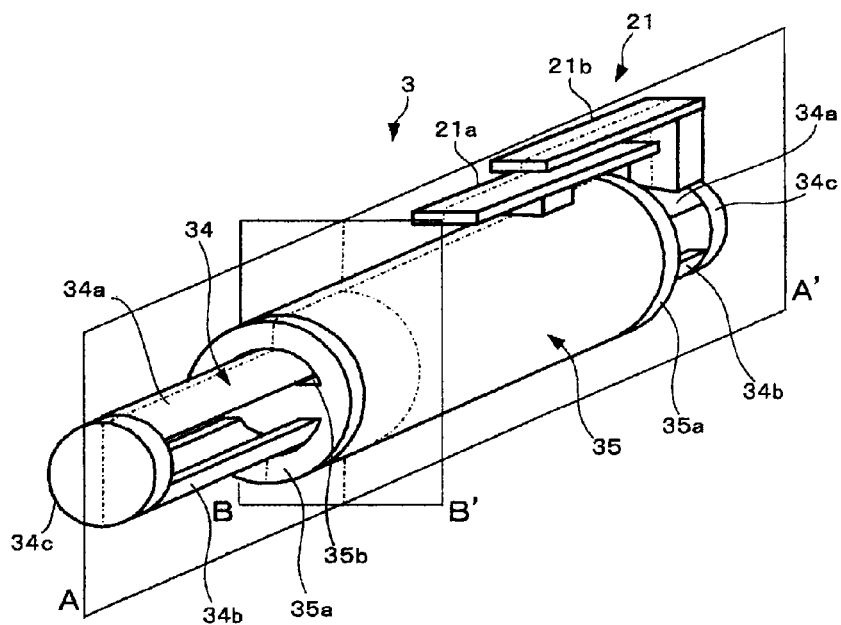
FIG. 2 is a perspective view showing the external appearance of a linear motor.
Figure 3:
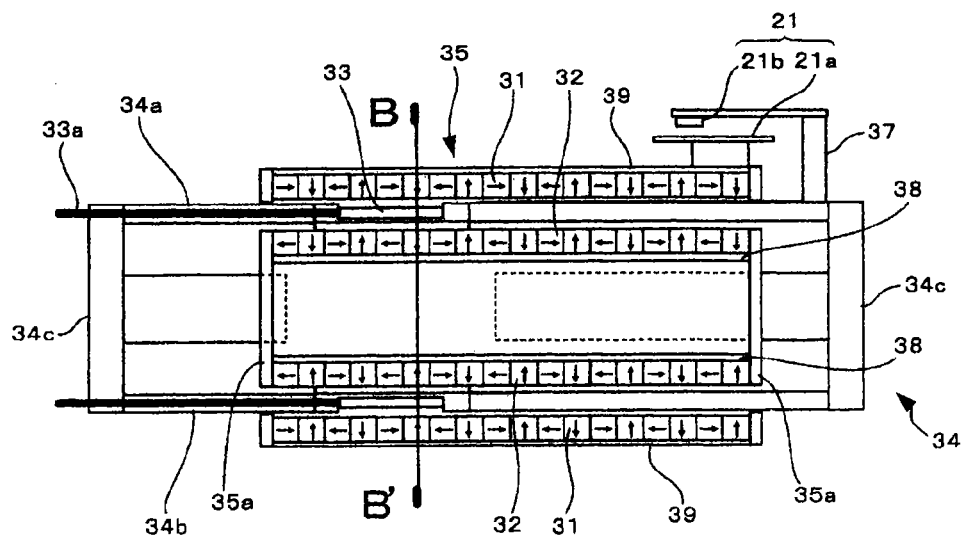
FIG. 3 is an A-A' cross-sectional view along the axis of the linear motor.
Figure 4:
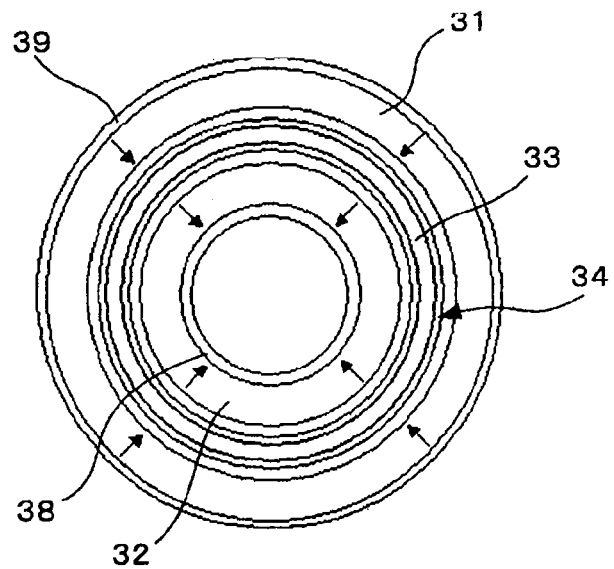
FIG. 4 is a B-B' cross-section view orthogonal to the axis of the linear motor.

FIG. 2 to FIG. 4 are views showing the detailed construction of the linear motor 3; FIG. 2 is a perspective view showing the external appearance of the linear motor 3; FIG. 3 is an A-A' cross-sectional view along the axis of the linear motor 3; and FIG. 4 is a B-B' cross-sectional view orthogonal to the axis of the linear motor 3.

As shown in FIG. 2, in general terms, the linear motor 3 comprises a floating output ring 34 and double cylinder 35. The double cylinder 35 is immovably fixed to a cover, that is fixed to a floor on for example the ground; the floating output ring 34 is arranged within the double cylinder 35; thrust in the linear direction is applied to an operating rod 41 that is fixed to the floating output ring 34, by moving the floating output ring 34 in the axial direction with respect to the double cylinder 35.

The double cylinder 35 has a concentric double shell. The floating output ring 34 is formed of non-magnetic material and has a shape in which a pair of elongate arcuate plates 34a, 34b face each other with their arc axes coinciding: in other words, a shape in which partial facing locations of the circumferential wall of the cylinder are cut away along the axis.

The outer shell of the double cylinder 35 is fixed through a supporting member to a cover that is fixed to a floor on for example the ground. The direction of arrangement of the double cylinder 35 may be vertical or horizontal; there is no particular restriction. The external diameter of the floating output ring 34 is smaller than the diameter of the outer shell of the double cylinder 35, but larger than that of the inner shell. This floating output ring 34 extends within the double cylinder 35, being interposed between the outer shell and the inner shell of the double cylinder 35.

This floating output ring 34 is not subject to any mechanical restraint by the double cylinder 35 or other structural member in the linear motor 3, apart from direct linkage with the movable contact 52 or indirect linkage therewith through the operating rod 41: it is in fact supported in a floating condition by magnetic repulsive force, as will be described later. In other words, the floating output ring 34 is not subject to any structural mechanical supporting force and there is for example no guide bar to restrict the position of the double cylinder 35 in the radial direction.

Both ends of the double cylinder 35 are closed by discs 35a that are formed by non-magnetic material. These discs 35a function as connecting members whereby the outer shell and the inner shell of the double cylinder 35 are linked while maintaining a fixed clearance and fixed attitude; the ends of the outer shell and inner shell of the double cylinder 35 are fixed to respective discs 35a. Also, a pair of arcuate plates 34a, 34b of the floating output ring 34 are linked by discs 34c fixed at both ends thereof, maintaining a fixed clearance and a fixed attitude.

Furthermore, the length of the floating output ring 34 in the axial direction is longer than the length of the double cylinder 35 in the axial direction. In more detail, apertures 35b that pass through the floating output ring 34 are formed in the discs 35 that block both ends of the double cylinder 35, matching the shape of the arcuate plates 34a, 34b.

Thus, as shown in FIG. 3 and FIG. 4, by excitation of the 3-phase coil 33, the linear motor 3 having such a shell construction extends/retracts the floating output ring 34, on which is wound the 3-phase coil 33, in the axial direction, by the magnetic field generated by a row of external permanent magnets 31 maintaining approximately equal magnetic energy and a row of internal permanent magnets 32; thereby subjecting this ring to thrust in the axial direction.

Specifically, the 3-phase coil 33 is wound on the floating output ring 34 in the interior of the linear motor 3. The location of the floating output ring 34 where the 3-phase coil 33 is wound is recessed by one level to a degree such that sufficient strength can be maintained but without piercing the ring: thus the 3-phase coil 33 is embedded in or flush with the external circumferential surface of the floating output ring 34. A supply lead 33a for the excitation current for the 3-phase coil 33 extends from the disc 34c through the interior of the circumferential wall of the floating output ring 34.

The row of external permanent magnets 31 and the row of internal permanent magnets 32 are arranged along the axial direction on each side of the shell wall forming the floating output ring 34. A fixed clearance is provided between the shell wall of the floating output ring 34 and the row of external permanent magnets 31 and the row of internal permanent magnets 32.

The internal permanent magnets 32 are of arcuate or annular shape and are fixed to an internal pipe 38. This internal pipe 38 constitutes an internal shell of the double cylinder 35 whose position is fixed within the floating output ring 34. These internal permanent magnets 32 are inserted at the outer circumferential surface of this internal pipe 38, with a plurality of these internal permanent magnets being lined up in the axial direction of the internal pipe 38: these internal permanent magnets thus face the inner circumferential face of the floating output ring 34.

The external permanent magnets 31 are also of arcuate or annular shape and are fixed to an external pipe 39. This external pipe 39 constitutes an external shell of the double cylinder 35 whose position is fixed so as to be accommodated within the floating output ring 34. These external permanent magnets 31 are inserted at the inner circumferential surface of this external pipe 39, with a plurality of these external permanent magnets being lined up in the axial direction of the external pipe 39: these external permanent magnets thus face the outer circumferential face of the floating output ring 34.

The internal permanent magnets 32 and external permanent magnets 31 are respectively arranged in a Halbach array, in which the direction of magnetization is successively varied by a small amount. In this embodiment, in the cross-section containing the central axis of the floating output ring 34, the permanent magnets are arranged so that the direction of magnetization of adjacent permanent magnets is rotated in each case by 90° at most.

Also, the direction in which the magnetization is rotated is opposite as between the row of internal permanent magnets 32 and the row of external permanent magnets 31. Specifically, for example, the direction of magnetization viewed in order along the row of external permanent magnets 31 rotates clockwise, whereas the direction of magnetization viewed in order along the row of internal permanent magnets 32 rotates anticlockwise.

Furthermore, these internal permanent magnets 32 and external permanent magnets 31 are arranged opposite each other in one-to-one fashion on each side of the shell wall of the floating output ring 34. The internal permanent magnets 32 and external permanent magnets 31 having radial components whose magnetization vectors are in the same direction face each other and the internal permanent magnets 32 and external permanent magnets 31 having axial components whose magnetization vectors are oppositely directed face each other. These radial and axial directions are directions referred to the arcuate or annular external permanent magnets 31 and internal permanent magnets 32.

Also, in this linear motor 3, relative position with respect to the row of external permanent magnets 31 of the 3-phase coil 33 is detected by a position sensor 21. The position sensor 21 is constituted by a linear scale 21a and optical pickup 21b.

The optical pickup 21b is mounted on a connecting member 37 that is erected in a portion, at the outer circumferential face of the floating output ring 34, that projects from the double cylinder 35, and thus moves together with the floating output ring 34. The linear scale 21a is mounted at the outer circumferential face of the external pipe 39 of the double cylinder 39 and faces the optical pickup 21b. The direction of orientation of the emitted and received light of the optical pickup 21b faces the linear scale 21a, so that it detects the graduations of the linear scale 21a.

(1-3. Drive Device)

Figure 5:
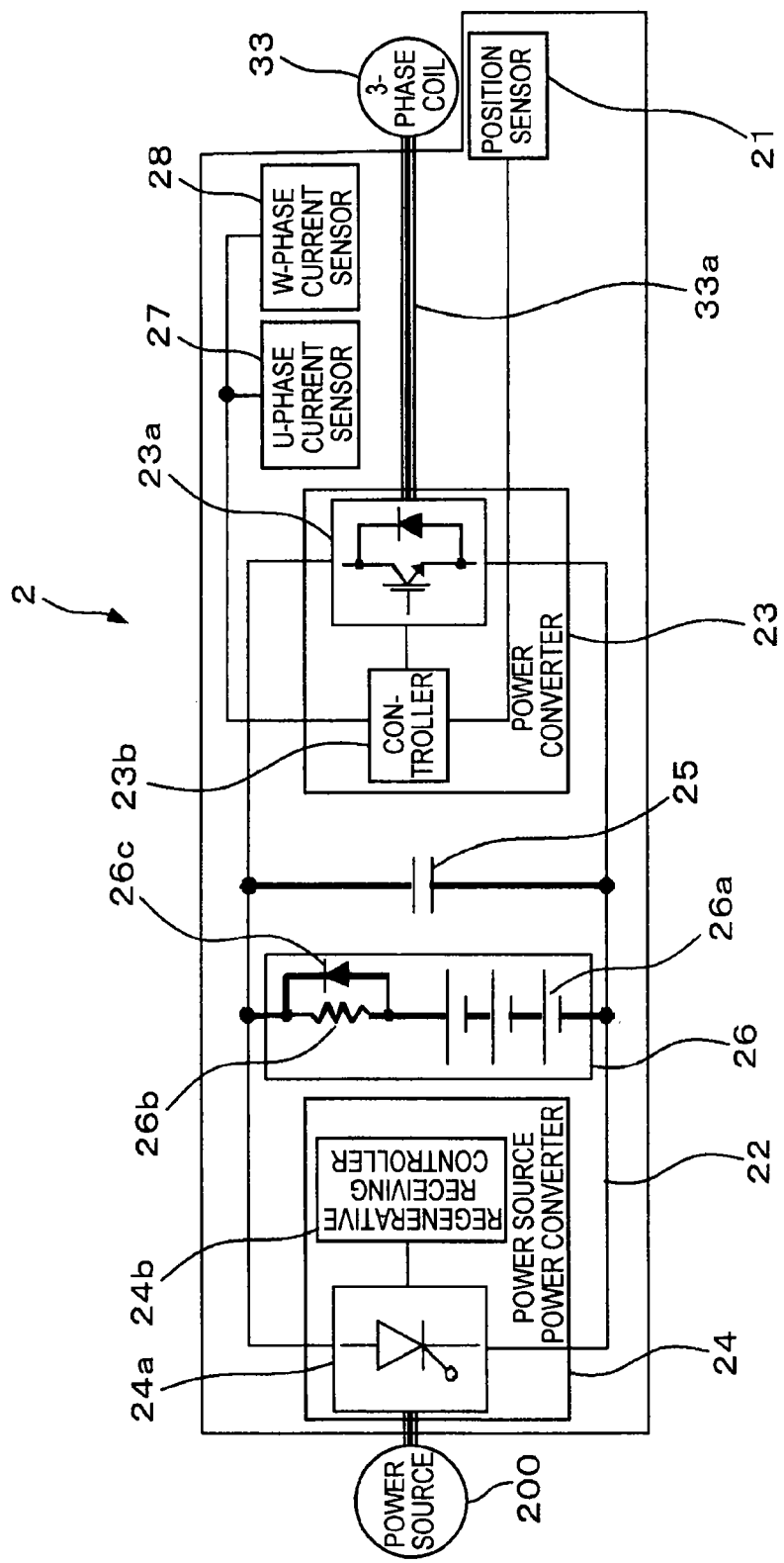
FIG. 5 is a layout diagram of a drive device.

FIG. 5 is a layout diagram of the drive device 2.

The drive device 2 comprises a power source converter 24 and a power converter 23 that receives and delivers power through the bus 22. The smoothing capacitor 25 and storage device 26 are connected with the bus 22 as power storage means.

The smoothing capacitor 25 and storage device (or electrical storage device) 26 are connected in parallel so as to function as a smoothing circuit and so as to suppress to a low level voltage fluctuations of the bus 22 even during power consumption by the 3-phase coil 33 or regeneration of power from the 3-phase coil 33. A plurality of such smoothing capacitors 25 and storage devices 26 may be provided at suitable locations of the bus 22.

In the storage device 26, there are arranged a battery 26a, resistor 26b and diode 26c. The resistor 26b and diode 26c are connected with the positive electrode side of the battery 26a and the resistor 26b and diode 26c are connected in parallel. Specifically, in order to suppress overcharging of the battery 26a, the arrangement is such that there is no power consumption by the resistor 26b during power supply from the battery 26a, but some of the charging current is consumed by the resistor 26b in the case of charging of the battery 26a.

The power source power converter 24 comprises an inverter 24a and regenerative receiving controller 24b. In response to a regenerative power-receiving instruction signal from outside, the regenerative receiving controller 24b regenerates to the power source 200 power accumulated on the smoothing capacitor 25 and battery 26a, and controls the ignition angle of the inverter 24a in order to store power from the power source 200.

The power converter 23 is an example of excitation means that generates exciting current for exciting the 3-phase coil 33. This power converter 23 comprises a PWM (Pulse Width Modulation) inverter 23a that generates AC exciting current for the 3-phase coil 33 and supplies this to the 3-phase coil 33 through a supply lead 33a. Also, this power converter 23 comprises a controller 23b that controls the exciting current that is supplied and generated by the PWM inverter 23a.

The PWM inverter 23a comprises a group of power conversion elements; the controller 23b controls the ignition angles of this group of power conversion elements. In this process, the controller 23b controls the PWM inverter 23a so as to generate in the 3-phase coil 33 thrust and supporting force equal to a thrust instruction value iq-ref and supporting force instruction value id-ref that are input from outside the drive device 2. Outside the drive device 2 is an external terminal that is connected so as to be capable of electrical communication with the power switching device 100 for example by means of a signal lead.

It should be noted that the thrust constitutes the motive force in the axial direction of the floating output ring 34. The supporting force is a floating force in the radial direction of the floating output ring 34 and produces an action whereby the attitude of the floating output ring 34 is guided by bringing the central axis of the floating output ring 34 into coincidence with the central axis of the double cylinder 35.

(1-4. Controller)

Figure 6:
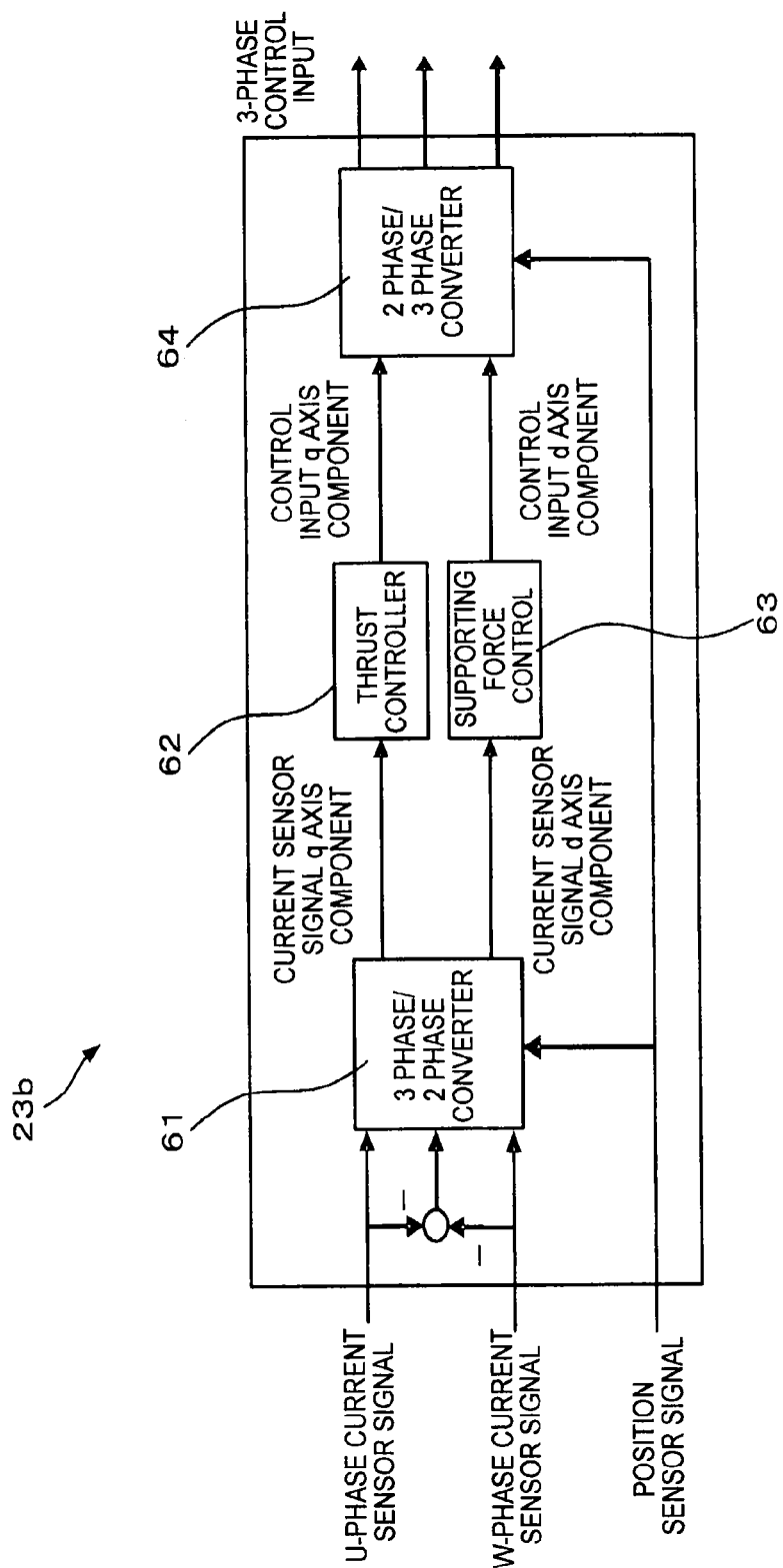
FIG. 6 is a layout diagram of a controller.

FIG. 6 is a layout diagram of the controller 23*b*. Of the U, V and W phases of the 3-phase coil 33, the controller 23*b* is connected so as to be capable of receiving signals by means of a signal lead with a U-phase current sensor 27 and W-phase current sensor 28 (see FIG. 5), that detect the excitation current of at least the U phase and W phase, and is connected with a position sensor 21 that detects the relative position of the row of external permanent magnets 31 of the 3-phase coil 33. The controller 23*b* performs thrust control and supporting force control by reference to the signals from the U phase current sensor 27 and W phase current sensor 28 and position sensor 21.

As an example, this controller 23*b* comprises: a 3-phase/2-phase converter 61; a thrust controller 62; a supporting force controller 63; and a 2-phase/3-phase converter 64. The 3-phase/2-phase converter 61, the thrust controller 62, the supporting force controller 63, and the 2-phase/3-phase converter 64 may be constituted by computers such as a DSP (digital signal processor) or RISC (Reduced Instruction Set Computer).

The 3-phase/2-phase converter 61 successively calculates the Clarke transform and Park transform by inputting the U-phase current, the V-phase current and W-phase current of the 3-phase coil 33 and the distance moved by the 3-phase coil 33, and calculates the d axis current component id and q axis current component iq of the excitation current that is injected into the 3-phase coil 33.

The d axis current component id is the current component that contributes to the magnetic field of the 3-phase coil 33, while the q axis current component iq is the current component that contributes to the thrust of the 3-phase coil 33. The V-phase current may be inferred using the U-phase current and W-phase current, which lead and lag by 120°. Specifically, the 3-phase/2-phase converter 61 is connected so as to be capable of receiving signals through a signal lead with the U-phase current sensor 27, W-phase current sensor 28 and position sensor 21.

The thrust controller 62 inputs a thrust instruction value iq-ref from outside and the q axis current component iq from the 3-phase/2-phase converter 61, and calculates the control input q axis component at which the thrust inferred from the q axis current component iq or the q axis current component iq becomes equal to the target thrust indicated by the thrust instruction value iq-ref, or the q axis current component of the excitation current that generates the target thrust in question. In the case where the PWM inverter 23*a* performs current control, this control input q axis component is the current value, and in the case where the PWM inverter 23*a* performs voltage control is the voltage value.

The calculation of the control input q axis component by the thrust controller 62 is performed by for example PI control (proportional Integral Control) or by PID control (proportional Integral Derivative Control). Specifically, the thrust controller 62 calculates a control input q axis component that is proportional to the deviation of the thrust instruction value iq-ref and the q axis current component iq, the integral of the deviation, or the differential of the deviation, or the sum of a combination of these.

The supporting force controller 63 inputs a supporting force instruction value id-ref from outside and the d axis current component id from the 3-phase/2-phase converter 61, and calculates the control input d axis component at which the supporting force inferred from the d axis current component id or the d axis current component id becomes equal to the target supporting force indicated by the thrust instruction value id-ref, or the d axis current component of the excitation current that generates the target supporting force in question. In the case where the PWM inverter 23*a* performs current control, this control input d axis component is the current value, and in the case where the PWM inverter 23*a* performs voltage control is the voltage value. The target supporting force is the magnetic reaction to be generated by the 3-phase coil 33 in order to make the central axis of the floating output ring 34 coincident with the central axis of the double cylinder 35.

The calculation of the control input d axis component by the supporting force controller 63 is performed by for example PI control or by PID control. Specifically, the supporting force controller 63 calculates a control input d axis component that is proportional to the deviation of the supporting force instruction value id-ref and the d axis current component id, the integral of the deviation, or the differential of the deviation, or the sum of a combination of these.

The 3-phase/2-phase converter 64 successively calculates the inverse Park transform and inverse Clarke transform by inputting the control input d axis component and the control input q axis component of the dq axis system that were input from the thrust controller 62 and supporting force controller 63, and thereby calculates the control inputs to the U phase, the V phase and W phase. The 2-phase/3-phase converter 64 then delivers these control inputs for the U phase, V phase and W phase to the PWM inverter 23*a*, thereby causing it to generate the excitation current that is injected into the 3-phase coil 33. This excitation current provides the force that generates thrust and supporting force in accordance with the thrust instruction value iq-ref and the supporting force instruction value id-ref.

The thrust instruction value iq-ref is determined by the next target axial speed and target axial position of the floating output ring 34 and is generated based on information indicating the distance of movement of the 3-phase coil 33 that is output by the position sensor 21. The supporting force instruction value id-ref, on the other hand, is passively stable with no need for sensing feedback control of the radial relative displacement and relative attitude angle of the floating output ring 34, and so has a fixed value.

Specifically, the axial movement and attitude stability of the floating output ring 34 are controlled by a control system with one degree of freedom in the axial direction by the controller 23*b*. Consequently, this supporting force instruction value id-ref, which is a fixed value, can be stored in a storage region such as a storage region of memory provided in the supporting force controller 63.

(1-5. Transmission Mechanism)

Figure 7:
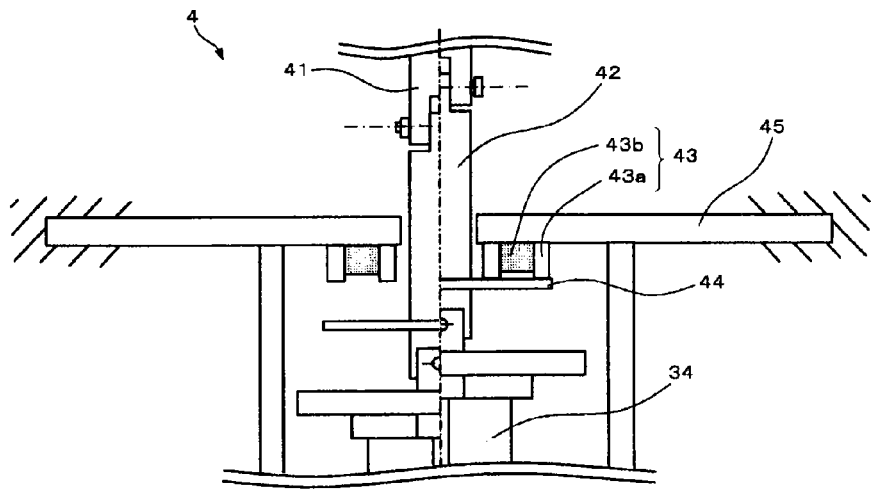
FIG. 7 is a layout diagram showing a transmission mechanism.

FIG. 7 is a layout diagram showing the transmission mechanism 4, the left-hand half of this FIGure showing the interrupted condition and the right-hand side showing the closed condition. It should be noted that, although, in this embodiment, the description was given with reference to an example in which the closed condition is held, it would be possible to hold the interrupted condition using an identical mechanism.

First of all, another, intermediate rod 42 is connected between the operating rod 41 of the transmission mechanism 4 and the floating output ring 34. One end of this intermediate rod 42 and one end of the output ring 34 are rotatably supported by means of a common pin. Also, the other end of the intermediate rod 42 and one end of the operating rod 41 are rotatably supported by means of a common pin. The pin whereby the intermediate rod 42 and the output ring 34 are rotatably supported and the pin whereby the operating rod 41 and the intermediate rod 42 are rotatably supported are orthogonally arranged.

Also, the transmission mechanism 4 is provided with a magnetic unit 43 and target 44 and maintains a contacting condition of the movable contact 52 and fixed contact 53 by means of the magnetic attractive force. The target 44 is a plate-shaped member formed by a ferromagnetic body and is erected at the circumferential face of the intermediate rod 42. Furthermore, the intermediate rod 42 is inserted in a frame 45 that is fixed on the ground, but the magnetic unit 43, which is constructed of a yoke 43a formed by a ferromagnetic body and permanent magnet 43b, is fixed in the vicinity of a hole through which the intermediate rod 42 of the frame 45 passes, so as to face the target 44.

The positional relationship of the magnetic unit 43 and the target 44 is that the magnetic unit 43 is on the side of the switching mechanism 5 and the target 44 is on the side of the floating output ring 34. The essential feature is that, when the operating rod 41 is moved in a direction such as to cause the movable contact 52 to come into contact with the fixed contact 53, both are arranged in such a way that the target 44 approaches the magnet unit 43. It should be noted that the same effect could also be obtained by an opposite positional relationship of the magnet unit 43 and the target 44.

(2. Action)

(2-1. Guidance and Attitude of the 3-Phase Coil)

The operation and action of such a power switching device 100 will now be described. First of all, the attitude of the 3-phase coil 33 when an exciting current that has a d axis current component other than 0 (id 0) is injected into the 3-phase coil 33 will be described.

Figure 8:
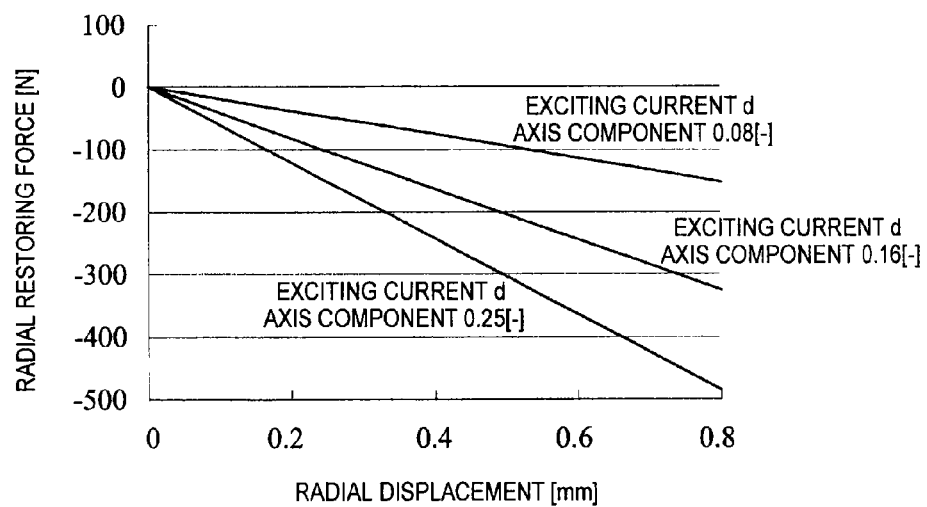
FIG. 8 is a diagram showing the repulsive force when the d axis component of the exciting current is constant.
Figure 9A:
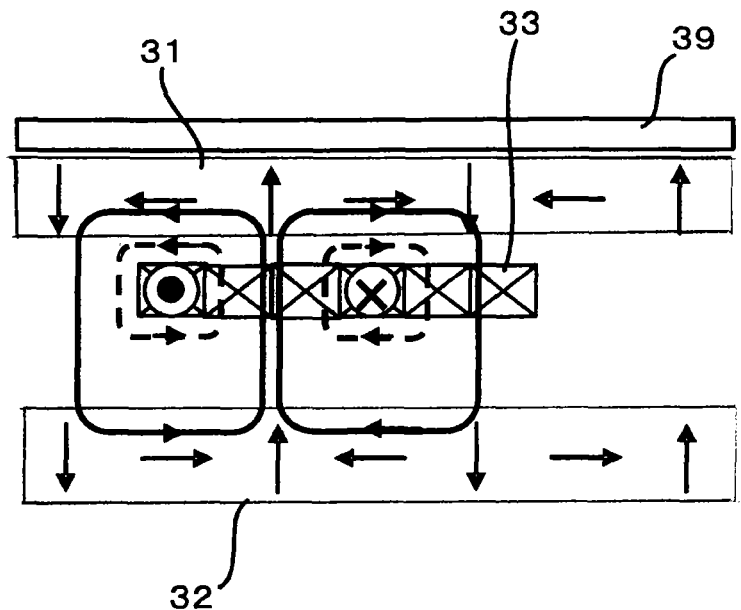
FIG. 9A and FIG. 9B are diagrams showing the condition of the magnetic flux around a 3-phase coil.
Figure 9B:
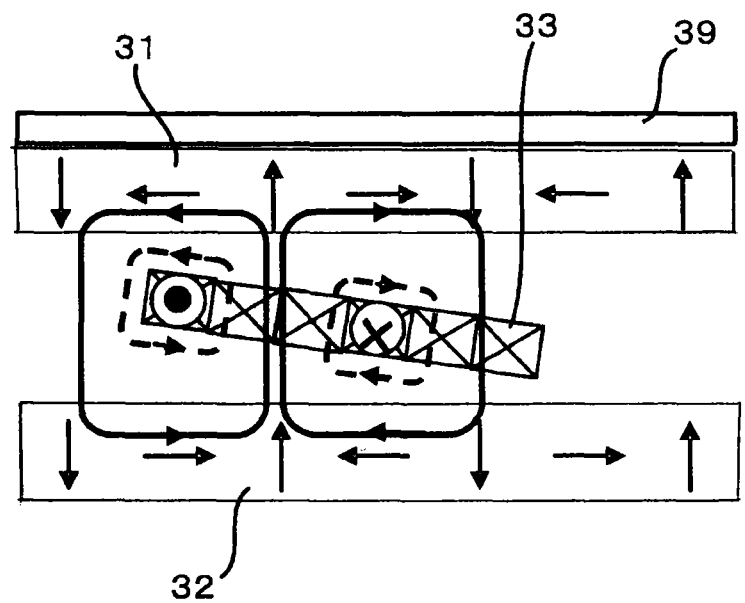

FIG. 8 shows the repulsive force when the d axis component of the exciting current is constant; the values of the d axis component of the exciting current are shown in terms of the ratio thereof with respect to the q axis component of the exciting current in regular operation. FIG. 9A and FIG. 9B show the condition of the magnetic flux around the 3-phase coil 33: in the case of the present invention, the linear motor 3 is arranged horizontally.

First of all it may be noted that the d axis current component of the exciting current has a field magnetic action on the 3-phase coil 33. The magnetic flux created by the 3-phase coil by this field magnetic action repels the magnetic flux that is formed by the row of external permanent magnets 31 and the row of internal permanent magnets 32. This repulsive force becomes larger as the distance between the magnetic flux lines becomes mutually shorter.

Such a restoring force is supported by the analysis results shown in FIG. 8. As shown in FIG. 8, the restoring force becomes larger in proportion to the radial relative displacement of the floating output ring with respect to the double cylinder 35. Also, the constant of proportionality is varied by varying the d axis current component of the exciting current. Consequently, the intended supporting force and the relative attitude of the floating ring 34 with respect to the double cylinder 35 can be obtained by controlling the d axis current component of the exciting current.

Consequently, as shown in FIG. 9A, if the upper semicircle of the floating output ring 34 floats up, biased towards the ceiling side of the external pipe 39, on the upper semicircle of the linear motor 3, the 3-phase coil 33 approaches the row of external permanent magnets 31, and the repulsive force acting between the row of external permanent magnets 31 and the 3-phase coil 33 becomes larger than the force acting between the row of internal permanent magnets 32 and the 3-phase coil 33.

Contrariwise, if, on the lower semicircle of the linear motor 3, the 3-phase coil 33 approaches the row of internal permanent magnets 32, the repulsive force acting between the row of internal permanent magnets 32 and the 3-phase coil 33 becomes larger than the force acting between the row of external permanent magnets 31 and the 3-phase coil 33.

As a result, on the floating output ring 34 on which the 3-phase coil 33 is wound, there acts a downwardly directed force tending to return the axis of this floating output ring 34 into coincidence with the axis of the double cylinder 35.

Also, as shown in FIG. 9B, when the 3-phase coil 33 is rotated in the clockwise direction, a downwardly directed force acts on the floating side of the 3-phase coil 33, whereas an upwardly directed force acts on the sinking side of the 3-phase coil 33: in this way, an anticlockwise moment is generated on the floating output ring 34 on which the 3-phase coil 33 is wound, tending to return the axis of this floating output ring 34 to coincidence with the axis of the double cylinder 35.

Thus this action plays the role of guiding the movement of the floating output ring 34 with one degree of freedom in the axial direction. This action utilizes magnetic repulsive force and so is passively stable in relation to degrees of freedom other than in the axial direction of the floating output ring 34: there is thus no need for sensing and feedback control of the radial relative displacement and relative attitude angle of the floating output ring 34.

In more detail, for control of the d axis component of the exciting current, it is sufficient merely to make use of the necessary U-phase current sensor 27 and W-phase current sensor 28 and position sensor 21. Also, although the floating output ring 34 is not passively stable in relation to movement in the axial direction thereof, this movement is controlled by the thrust controller 62, so no problem at all arises in this respect.

(2-2. Interruption Step)

When a fault current is generated in the system in a power switching device 100 wherein the supporting force with respect to the floating output ring 34 is controlled as described above, a thrust instruction value iq-ref and a supporting force instruction value id-ref are input from outside. If the supporting force instruction value id-ref is stored in the power switching device 100, only the thrust instruction value iq-ref is input.

The thrust controller 62 instructs the PWM inverter 23a to generate exciting current for the 3-phase coil 33, causing an exciting current that has a q axis current component iq equal to the thrust instruction value iq-ref to be injected with respect to the 3-phase coil 33.

As shown in FIG. 9A and FIG. 9B, the row of external permanent magnets 31 and the row of internal permanent magnets 32 then form a magnetic circuit in which the row of external permanent magnets 31 and the row of internal permanent magnets 32 are coupled in a ring. Specifically, the magnetic circuit is formed by coupling the axial magnetic flux that passes through the interior of the row of external permanent magnets 31 and the row of internal permanent magnets 32 and the radial magnetic flux that passes through the gaps between the external permanent magnets 31 and the internal permanent magnets 32. Also, substantially no magnetic flux issues from the outside face of the row of external permanent magnets 31 and substantially no magnetic flux issues from the inside face of the row of internal permanent magnets 32.

Thus the overwhelming majority of the radial magnetic flux is distributed in the gaps between the external permanent magnets 31 and the internal permanent magnets 32 and most of the radial magnetic flux is orthogonally interlinked with respect to the excited 3-phase coil 33.

Consequently, by the mutual interaction of the magnetic forces and the mutual interaction of the magnetic field and the current, the floating output ring 34 on which the 3-phase coil 33 is wound generates thrust that is proportional to the thrust instruction value iq-ref 4 moving in the axial direction between the row of external permanent magnets 31 and the row of internal permanent magnets 32.

Also, the supporting force controller 63 instructs the PWM inverter 23a to generate an exciting current with respect to the 3-phase coil 33, causing an exciting current to be injected that has a d axis current component id that is equal to the supporting force instruction value id-ref, which is a fixed value, with respect to the 3-phase coil 33.

Consequently, by the mutual interaction of the magnetic fluxes generated by the row of external permanent magnets 31 and the row of internal permanent magnets 32, magnetic flux is generated in the 3-phase coil 33 such as to make the central axis of the floating output ring 34 coincide with the central axis of the double cylinder 35, and, by the repulsive force of these magnetic fluxes, even during movement of the floating output ring 34 in the axial direction, the position and attitude thereof in the radial direction are maintained constant.

In this way, the floating output ring 34 on which the 3-phase coil 33 is wound can pull the operating rod 41 by movement in the axial direction, whilst its position and attitude are stabilized in the radial direction. The movable contact 52 that is linked with the operating rod 41 thereby starts to separate from the fixed contact 53 and current interruption is achieved by extinction of the arc discharge after this has passed the current zero point.

With the timing with which the current interruption is achieved i.e. when the value detected by the position sensor 21 has reached the desired value (predetermined value), the controller 23b stops the injection of exciting current to the 3-phase coil 33. It should be noted that it is desirable that, before injection of exciting current is stopped i.e. immediately before the stoppage of the floating output ring 34, the q axis current component iq should gradually approach zero and the speed of movement of the floating output ring 34 should be lowered, thereby suppressing contact impact of the target 44 and magnet unit 43.

The closure action of the power switching device 100 is the same as this interruption action; when a closure instruction is input to the power switching device 100, a closure operation that is the same as in the case of the interruption action but in the opposite direction to the interruption action is performed, to connect the movable contact 52 and the fixed contact 53 by applying AC current to the 3-phase coil 33.

(Closed Condition)

When the linear motor 3 is in the stopped condition, no thrust at all is output to the movable contact 52 of the switching mechanism 5 whilst the movable contact 52 is in contact with the fixed contact 53. In this current-closed condition, as shown in the right-hand half of FIG. 7, the target 44 is in contact with the magnet unit 43. Consequently, the magnetic attractive force of the magnet unit 43 acts strongly on the target 44, with the result that the target 44 is fixed to the magnet unit 43.

When the target 44 is fixed to the magnet unit 43, drive of the intermediate rod 42 and the operating rod 41 is prevented, so the movable contact 52 is also maintained in the closed position. Consequently, even if external force such as weight acts on the movable contact 52 in this stopped condition of the linear motor 3, the closed condition can be maintained without continued operation of the linear motor 3. Consequently the transmission mechanism 4 according to this embodiment does not depend on a mechanical system and does not require electrical power in order to maintain the closed condition.

It should be noted that "contact" of the target 44 with the magnet unit 43 indicates a condition in which magnetic attractive force acts to an extent such that the target 44 is fixed to the magnet unit 43 so that the position of the movable contact 52 is maintained i.e. it also includes a condition in which, while not strictly in contact, this is in very close proximity therewith.

(3. Beneficial Effect)

As described above, in a linear motor 3 for mutually moving and opening/closing device between an interrupted condition and closed condition by reciprocating drive of a movable contact 52 of a power switching device 100, in this embodiment, there are provided a row of external permanent magnets 31 and a row of internal permanent magnets 32 and a floating output ring 34 on which is wound a 3-phase coil 33.

Apart from being directly or indirectly linked with the movable contact 52, the floating output ring 34 has no mechanical restraining relationship with other members. Instead, the controller 23b that controls the PWM inverter 23a that injects AC exciting current into the 3-phase coil 33 brings the central axes of the double cylinder 35 and the floating output ring 34 into coincidence by generating supporting force for the floating output ring 34 by magnetism, by controlling the d axis current component of the exciting current. Consequently, high maintainability can be achieved without the linear motor 3 possessing any mechanical guide for the floating output ring 34 at all.

Also, the row of external permanent magnets 31 is constituted by arranging these permanent magnets 31 adjacently so that the poles of annular or arcuate permanent magnets are rotated by at most 90° in each case in a cross-sectional plane containing their central axes. The poles of the annular or arcuate permanent magnets of the row of internal permanent magnets 32 have magnetization vector radial components in the same direction as the row of external permanent magnets 31 and magnetization vector axial components in the opposite direction to the row of external permanent magnets 31. Also, these rows of external permanent magnets 31 and internal permanent magnets 32 are oppositely fixed so that the magnetization vector radial components of the respective poles thereof face in the same direction.

Thrust is thereby generated for reciprocating drive of the movable contact 52 by the action of the excited 3-phase coil 33 and the magnetic circuit produced by the row of external permanent magnets 31 and the row of internal permanent magnets 32. Substantially all of the magnetic flux then constitutes a magnetic circuit between the outside face of the row of external permanent magnets 31 and the inside face of the row of internal permanent magnets 32, with substantially no flux issuing from the outside face of the row of external permanent magnets 31 and the inside face of the row of internal permanent magnets 32. Consequently, a back yoke is not required.

In addition, the row of external permanent magnets 31 and the row of internal permanent magnets 32 hold substantially equal quantities of magnetic energy, so most of the magnetic flux in the radial direction is distributed in the gap between the row of external permanent magnets 31 and the row of internal permanent magnets 32. In addition, the 3-phase coil 33 is arranged in the gap where the overwhelming majority of the magnetic flux in the radial direction is distributed, so most of the magnetic flux is interlinked at right angles with the 3-phase coil 33, and large thrust is generated with less current. Increased operating speed can thereby be achieved.

Also, when the linear motor 3 is in operating condition, the core and yoke are not in the vicinity of the 3-phase coil 33 or within the main magnetic flux created by the row of external permanent magnets 31 and the row of internal permanent magnets 32, so the self-inductance of the 3-phase coil 33 become small. Consequently, even when the floating output ring 34 is operating at high speed, the voltage necessary to pass the prescribed exciting current to the 3-phase coil 33 is greatly reduced.

Also since the floating output ring 34 requires no iron core or yoke, a reduction in weight can be achieved and the major portion of the 3-phase coil 33 is interlinked with the main magnetic flux created by the rows of external permanent magnets 31 and internal permanent magnets 32, so the thrust/weight ratio is improved. Response can therefore be improved.

Second Embodiment

Figure 10:
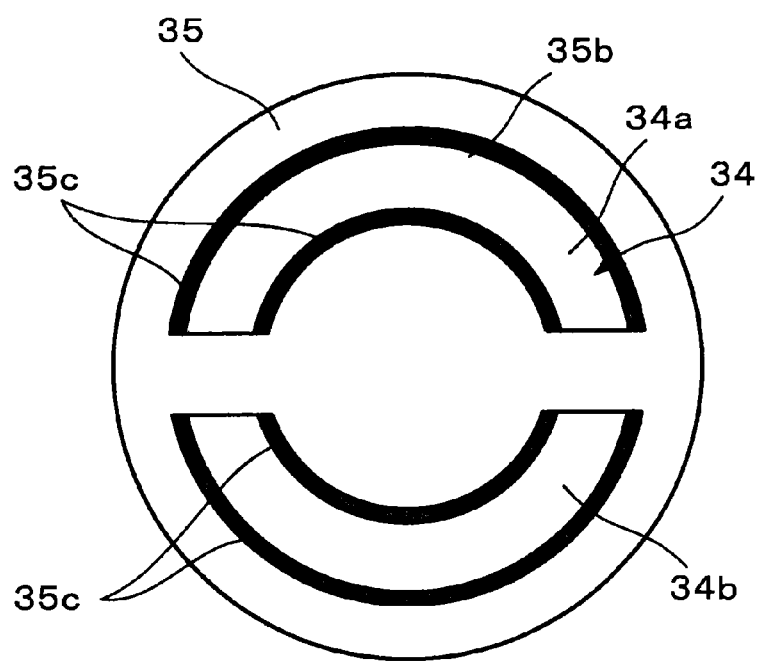
FIG. 10 is a diagrammatic external view of a linear motor seen from the axial direction, according to a second embodiment.

FIG. 10 is a diagrammatic external view seen from the axial direction of the linear motor 3, in a power switching device according to a second embodiment. This embodiment is the same as the first embodiment apart from the construction of the discs 35a provided at both ends of the double cylinder 35: description of the other parts thereof is therefore dispensed with.

As shown in FIG. 10, in this second embodiment, low-friction resin material 35c is provided along the inside edge at the apertures 35b through which the floating output ring 34 passes. The low-friction resin material 35c may be for example a fluorine resin. The thickness of these portions of low-friction resin material 35c provides a fixed clearance such that there is no contact with the apertures 35b of the arcuate plates 34a, 34b of the floating output ring 34 that passes through these apertures 35b, but is of a degree that permits maintenance of the presence of a gap without losing this clearance.

This low-friction resin material 35c prevents direct contact of the floating output ring 34 and the discs 35a of the double cylinder 35 and acts to ensure that, even if unanticipated contact occurs during operation, the sliding friction with respect to the floating output ring 34 can be kept to a low level.

Consequently, even if unanticipated excessive force caused by for example the central axis of the floating output ring 34 becoming offset from the central axis of the double cylinder 35 acts on the floating output ring 34, causing the floating output ring 34 and the discs 35a of the double cylinder 35 to come into contact, the sliding friction thereof is reduced, greatly reducing the likelihood of damage to the linear motor 3. Excellent maintenance characteristics can thereby be achieved and stable availability enabled even in the event of stoppage of operation or during emergencies.

Third Embodiment

Figure 11:
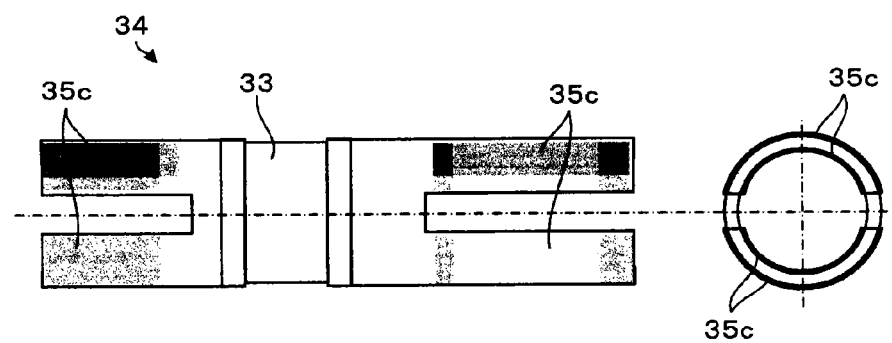
FIG. 11 is a diagrammatic external view showing the surface of a floating output ring, according to a third embodiment.

FIG. 11 is a diagrammatic external view showing the surface of a floating output ring 34 in a power switching device according to a third embodiment. This embodiment is the same as the first and second embodiments apart from the construction of the surface of the floating output ring 34, so description of other portions thereof is dispensed with.

As shown in FIG. 11, in this third embodiment, low-friction resin material 35c is provided at the surface of the floating output ring 34. The low-friction resin material 35c is attached in regions where there is a risk of contact with the discs 35a of the double cylinder 35. The thickness of these portions of low-friction resin material 35c provides a fixed clearance such that there is no contact of the floating output ring 34 with the discs 35a of the double cylinder 35 but is of a degree that permits maintenance of the presence of a gap without losing this clearance.

This low-friction resin material 35c also prevents direct contact of the floating output ring 34 and the discs 35a of the double cylinder 35 or the internal circumferential surface of the external pipe 39 and acts to ensure that, even if unanticipated contact occurs during operation, the sliding friction with respect to the floating output ring 34 can be kept to a low level.

Consequently, just as in the case of the second embodiment, the likelihood of damage to the linear motor 3 is greatly reduced and excellent maintenance characteristics can be achieved and stable availability enabled even in the event of stoppage of operation or during emergencies.

Fourth Embodiment

In the first embodiment, the double cylinder 35 functions as the fixed element and the floating output ring 34 functions as the movable element. However, so long as the double cylinder 35 and the floating output ring 34 perform relative movement and axial thrust is generated, as shown in FIG. 12 and FIG. 13, the transmission mechanism 4 may be connected with the double cylinder 35 so that the double cylinder 35 functions as the movable element and the floating output ring 34 functions as the fixed element.

Figure 12:
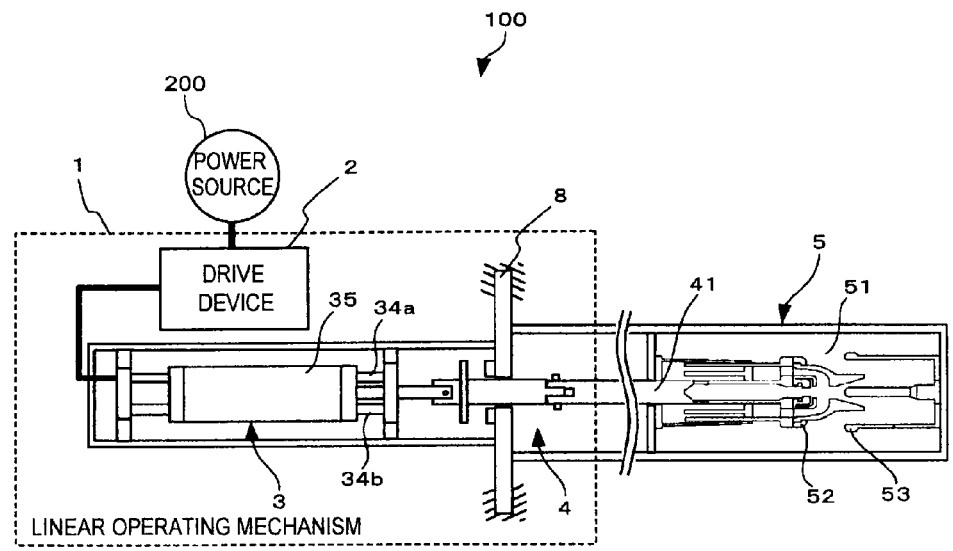
FIG. 12 is an internal layout diagram showing a power switching device according to a fourth embodiment.

FIG. 12 is an internal layout diagram showing a power switching device according to a fourth embodiment. As shown in FIG. 12, arcuate plates 34a and 34b of a floating output ring 34 are immovably fixed to a cover that is fixedly installed on a floor such as on the ground. As one example, a disc 34c that links the arcuate plates 34a and 34b is fixed to a supporting member that projects from the inner circumferential surface of the cover. In contrast, the double cylinder 35 has no structurally fixed relationship with the cover.

Figure 13:
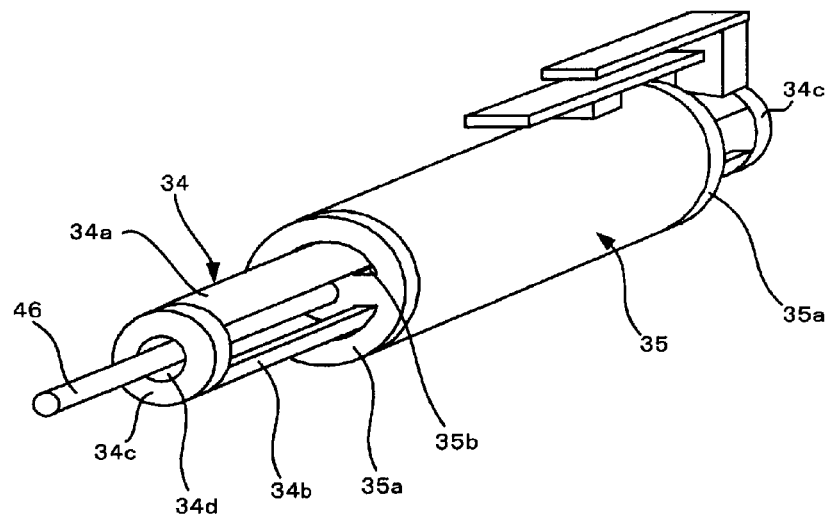
FIG. 13 is a perspective view showing an external view of a linear motor according to the fourth embodiment.

Also, FIG. 13 is a perspective view showing the external appearance of a linear motor 3 according to the fourth embodiment. As shown in FIG. 13, the double cylinder 35 is fixed to a second rod 46 that is erected facing the outside of the cylinder on a disc 35a. This second rod 46 is connected with an intermediate rod 42 of the transmission mechanism 4. An aperture 34d through which the second rod 46 is freely inserted is formed in the disc 34c in order to prevent physical interference of the disc 34c of the floating output ring 34 with this second rod 46.

Considered from the point of view of absolute coordinates, this embodiment is identical with the first embodiment in regard to the axial movement mechanism and action and the position in the radial direction and attitude holding mechanism and action produced by the magnetic repulsion, but differs merely in that the movable element that moves is opposite to that of the first embodiment. Consequently, in this embodiment also, the linear motor 3 has no mechanical guide at all, making it possible to achieve high maintainability.

Other Embodiments

While various embodiments of the present invention have been described in this specification, these embodiments are presented merely by way of example and are not intended to restrict the scope of the invention. Specifically, the invention includes combinations of all or any of the first to fourth embodiments. Embodiments as above can be put into practice in various other forms and various deletions or substitutions or alterations may be made without departing from the scope of the invention. Such embodiments or modifications thereof are likewise included in the scope or gist of the invention and are included in the invention set out in the patent claims and in the scope of equivalents thereof.

What is claimed is:

1. An operating mechanism for a power switching device for mutually shifting said power switching device between an interrupted condition and closed condition by reciprocating drive of a movable contact thereof, said operating mechanism comprising:
    a first row of permanent magnets constituted by arranging annular or arcuate first permanent magnets adjacently so that magnetic poles of said first permanent magnets are rotated by a maximum of 90° in each case in a cross-sectional plane including their central axes;
    a second row of permanent magnets constituted by arranging annular or arcuate second permanent magnets adjacently so that magnetic poles of said second permanent magnets are rotated by a maximum of 90° in each case in a cross-sectional plane including their central axes;
    a double cylinder that is fixed so that two rows maintain a fixed distance, with said first permanent magnets and said second permanent magnets, whose magnetization vector radial components are in the same direction, facing each other;
    a floating output ring arranged with a coil constituted by a conductor wound thereon, between said first row of first permanent magnets and said second row of said second permanent magnets, and having no mechanical restraining relationship with other members, apart from being directly or indirectly linked with said movable contact; and
    an exciting means for generating current for exciting said coil,
    wherein said exciting means comprises:
    a supporting force control means for keeping central axes of said double cylinder and said floating output ring coincident by generating supporting force for said floating output ring by magnetism, by controlling d axis current component of said exciting current, the d axis component contributing to magnetic field of said coil; and
    a thrust control means for generating an axial thrust between said double cylinder and said floating output ring by controlling q axis current component of said exciting current, said q axis current contributing to thrust of said coil.

2. The operating mechanism for a power switching device according to claim 1,
    wherein said double cylinder comprises:
    a disc that links tubes of said double cylinder at an end face thereof and that fixes a distance of said tubes;
    an aperture provided on said disc and through which said floating output ring passes; and
    a low friction resin section that offers low friction with respect to said floating output ring, and is provided at said edge of said aperture.

3. A power switching device comprising:
    the operating mechanism according to claim 2,
    an opening/closing device including said movable contact capable of reciprocating movement, and
    said operating mechanism drives said movable contact, capable of mutual movement between an interrupted condition and closed condition by movement of said movable contact.

4. The operating mechanism for a power switching device according to claim 1,
    wherein said double cylinder comprises:
    a disc that links tubes of said double cylinder at an end face thereof and that fixes a distance of said tubes;
    an aperture provided on said disc and through which said floating output ring passes,
    wherein said floating output ring comprises a low friction resin section in a circumferential surface region through which said aperture passes.

5. A power switching device comprising:
    the operating mechanism according to claim 4,
    an opening/closing device including said movable contact capable of reciprocating movement, and
    said operating mechanism drives said movable contact, capable of mutual movement between an interrupted condition and closed condition by movement of said movable contact.

6. The operating mechanism for a power switching device according to claim 1,
    wherein in addition, in said double cylinder, said first permanent magnets and said second permanent magnets whose magnetization vector axial components are oppositely directed face each other.

7. A power switching device comprising:
    the operating mechanism according to claim 1,
    an opening/closing device including said movable contact capable of reciprocating movement, and
    said operating mechanism drives said movable contact, capable of mutual movement between an interrupted condition and closed condition by movement of said movable contact.

* * * * *